United States Patent
Pearce et al.

(10) Patent No.: US 11,095,768 B2
(45) Date of Patent: Aug. 17, 2021

(54) ASSEMBLY AND METHOD FOR PREVENTING WIRELESS COMMUNICATION WHILE DRIVING

(71) Applicant: AtWill USA, The Woodlands, TX (US)

(72) Inventors: Richard J. Pearce, Conroe, TX (US); Scott D. Smiley, Fort Lauderdale, FL (US)

(73) Assignee: AtWill USA, The Woodlands, TX (US)

( * ) Notice: Subject to any disclaimer, the term of this patent is extended or adjusted under 35 U.S.C. 154(b) by 0 days.

(21) Appl. No.: 17/102,197

(22) Filed: Nov. 23, 2020

(65) Prior Publication Data

US 2021/0160365 A1    May 27, 2021

Related U.S. Application Data

(60) Provisional application No. 62/941,354, filed on Nov. 27, 2019, provisional application No. 63/027,097, filed on May 19, 2020, provisional application No. 63/058,176, filed on Jul. 29, 2020.

(51) Int. Cl.

| H04W 4/02 | (2018.01) |
|---|---|
| H04M 1/72463 | (2021.01) |
| H04W 4/48 | (2018.01) |
| H04W 4/12 | (2009.01) |
| H04M 1/72436 | (2021.01) |

(52) U.S. Cl.
CPC ... H04M 1/72463 (2021.01); H04M 1/72436 (2021.01); H04W 4/027 (2013.01); H04W 4/12 (2013.01); H04W 4/48 (2018.02)

(58) Field of Classification Search
CPC ......... H04M 1/72463; H04M 1/72436; H04W 4/48; H04W 4/12; H04W 4/027
See application file for complete search history.

(56) References Cited

U.S. PATENT DOCUMENTS

| 8,290,480 B2 | 10/2012 | Abramson et al. |
| 8,295,854 B2 | 10/2012 | Osann, Jr. et al. |
| 8,538,402 B2 | 9/2013 | Vidal et al. |
| 8,594,705 B2 | 11/2013 | Osann, Jr. et al. |

(Continued)

FOREIGN PATENT DOCUMENTS

WO    2020181001    9/2020

OTHER PUBLICATIONS

Apple, Inc., "How to Use Do Not Disturb While Driving—Apple Support", https://support.apple.com/en-us/HT208090, downloaded on Oct. 31, 2018, pp. 1-3.

(Continued)

*Primary Examiner* — Joseph E Dean, Jr.
(74) *Attorney, Agent, or Firm* — The Concept Law Group, PA; Scott D. Smiley

(57) ABSTRACT

A system, apparatus, and method for preventing wireless communication while driving is presented. The system including a text prevention device configured to be installed in a vehicle and detect mobile computing devices within the vehicle. The text prevention device is further configured to establish a connection with detected mobile computing devices and serve as a proxy device to receive signal transmissions transmitted from and received by the mobile computing devices preventing the mobile computing devices within the vehicle from distracting the driver during operation of the vehicle.

7 Claims, 6 Drawing Sheets

(56) References Cited

U.S. PATENT DOCUMENTS

| | | |
|---|---|---|
| 8,634,822 B2 | 1/2014 | Silver et al. |
| 8,761,821 B2 | 6/2014 | Tibbitts et al. |
| 8,914,014 B2 | 12/2014 | Vidal et al. |
| 8,971,927 B2 | 3/2015 | Zhou et al. |
| 9,060,123 B1* | 6/2015 | Daniel ............... H04N 5/232 |
| 9,179,297 B2 | 11/2015 | Osann, Jr. et al. |
| 9,198,113 B2 | 11/2015 | Rajeevalochana et al. |
| 9,363,734 B2 | 6/2016 | Rajeevalochana et al. |
| 9,386,447 B2 | 7/2016 | Tibbitts et al. |
| 9,609,621 B2 | 3/2017 | Osann, Jr. et al. |
| 10,200,935 B2 | 2/2019 | Silver |
| 10,237,280 B2 | 3/2019 | Day, II et al. |
| 10,367,934 B2 | 7/2019 | Villaume |
| 2009/0002147 A1 | 1/2009 | Bloebaum et al. |
| 2010/0297929 A1 | 11/2010 | Harris |
| 2010/0297930 A1 | 11/2010 | Harris |
| 2011/0195699 A1* | 8/2011 | Tadayon ............... H04W 4/029 |
| | | 455/418 |
| 2012/0040650 A1 | 2/2012 | Rosen |
| 2012/0214463 A1 | 8/2012 | Smith et al. |
| 2012/0309296 A1 | 12/2012 | Tieman et al. |
| 2013/0157574 A1 | 6/2013 | Craine |
| 2014/0329513 A1 | 11/2014 | Jacob |
| 2016/0050309 A1 | 2/2016 | Gooberman |
| 2016/0355122 A1 | 12/2016 | Cotter et al. |
| 2019/0270459 A1 | 9/2019 | Williams |

OTHER PUBLICATIONS

Cellcontrol, "Prevent Texting & Distracted Driving Accidents for Your Family in partnership with Liberty Mutual Insurance", https://www.cellcontrol.com/liberty-mutual-2, downloaded on Oct. 31, 2018, pp. 1-7.

Google, "Driving Detective—Apps on Google Play", https://play.google.com/store/apps/details?id=mk.com.vasilev.drivingdetective&hl=en_US, downloaded on Nov. 6, 2018, pp. 1-3.

Google, "In-Traffic Reply—Apps on Google Play", https://play.google.com/store/apps/details?id=com.samsung.intrafficreply&hl=en_US, downloaded on Oct. 31, 2018, pp. 1-3.

AT&T, "It Can Wait: AT&T DriveMode", http://about.att.com/sites/it_can_wait_drivemode, downloaded on Oct. 31, 2019, pp. 1-6.

Lifesaver, "Changing the culture of distracted driving", https://lifesaver-app.com/, date downloaded unknown, pp. 1-9.

ONETAP, "Features", date downloaded unknown, p. 1.

LIVE2TXT, "Stop Texting & Driving | Save Lives | Live 2 Text", http://www.getlive2txt.com/, downloaded on Oct. 31, 2018, p. 1.

Mobile Life Solutions, LLC, "Distracted Driving Kills TextLimit.com Saves Lives", https://www.textlimit.com/, downloaded on Oct. 31, 2018, pp. 1-4.

International Search Authority of the USPTO, International Search Report and Written Opinion for PCT/US2020/061868, dated Feb. 24, 2021, pp. 1-11.

* cited by examiner

ASSEMBLY AND METHOD FOR PREVENTING WIRELESS COMMUNICATION WHILE DRIVING

CROSS-REFERENCE TO RELATED APPLICATIONS

This application claims priority to U.S. Provisional Patent Application Ser. No. 62/941,354 filed Nov. 27, 2019; U.S. Provisional Patent Application Ser. No. 63/027,097 filed May 19, 2020; and U.S. Provisional Patent Application Ser. No. 63/058,176 filed Jul. 29, 2020, and claims the benefit of the aforementioned applications, the entireties of which are hereby incorporated by reference.

FIELD OF THE INVENTION

The present invention relates generally to preventing wireless communication while driving and, more particularly, relates to systems and methods for preventing computing device use during operation of a moving vehicle.

BACKGROUND OF THE INVENTION

Modern mobile communication devices, such as cellular telephones, tablets, media players with wireless connections, portable computers, and others, have provided users with a robust line of applications and abilities. Today, the vast majority of phones being put into service are of the "smart phone" type. These devices pack virtually all of the functionality, and possibly more, of traditional laptops into the small footprint of a phone. Of significance, virtually every cellular telephone now provides short messaging server (SMS) capabilities, i.e., "text" messaging, where users can communicate directly with each other by sending short messages. Utilization of any single feature, of which there are many, on the above-mentioned devices, requires significant time looking at the screen. This is especially true since SMSs now can and often do include photographs, videos, graphics, such as emoticons, and other multimedia content. Sending and receiving text messages is, to many people, so enjoyable, they cannot control their urge to do so, no matter the situation or circumstances.

It is undeniable that the use of mobile communication devices, while driving, is distracting to the driver and dangerous to both the driver and those around him or her. For this reason, many states have passed laws banning activities such as texting while driving. Although these laws are in place and most people know the dangers, texting while driving, surfing the Internet, and other distracting activities are still engaged in by drivers on a regular basis.

One group that is notorious for being distracted while driving is teenagers, although members of every age group are just as guilty. With the added component of the above-mentioned mobile devices, many parents are more fearful than ever of allowing their children to drive. One way to ensure children will not text and drive, as just one example of a distracting activity facilitated by a mobile communication device, is to require them to leave their cellular telephones at home. However, this puts the children in a dangerous situation of not having communicative capabilities. Although, in recent years, there was a time when most drivers did not have cellular telephone capability, they at least had the ability to pull over and utilize a pay telephone. Now, because cellular telephones have become so popular, pay phones have become virtually extinct. In addition, parents cannot prevent their children from using a passenger's mobile device while they drive.

Another group that needs to be controlled are commercial drivers, such as FEDEX, UPS, AMAZON drivers, and many more. These drivers are on the road eight hours a day. The likelihood for accidents is already high and the distraction of a smart phone, for example, significantly increases those risks. The liability for fleet owners is also enormous when their drivers are using computing devices, such as smart phones, while driving.

One way to prevent communication, including text and voice, is through use of a wireless signal jammer. Generally, the objective of a wireless signal jammer is to interrupt the availability of communication signals in the space of the receiver. Jammers cause enough interference with the communication between cell phones and towers to render the phones unusable.

Currently-available jammers can block all widely used systems (CDMA, iDEN, GSM, et al.) and are even very effective against newer phones which hop to different frequencies and systems when interfered with. Jammers, however, are illegal within the United States. In addition, as the dominant network technology and frequencies used for mobile phones vary worldwide, even if legal there, some work only in specific regions such as Europe or North America.

An alternative to "jamming" a signal is a method of tricking a device into thinking it is connected to a cellular network when it is not. In these systems, an intelligent network access controller for use with a wireless network creates a local wireless network that is an overlay to a part of an existing wireless network. The intelligent network access controller uses a multi-protocol interface and an access module to prevent mobile computing device access to the existing wireless network by locking wireless communications devices to the network access controller. Once locked, the user of the phone is unable to send or receive data or voice signals from his or her mobile device.

One possible way of preventing mobile communication while in a vehicle is to operate a network access controller or mobile phone jammer within or on the vehicle, thereby temporarily disabling communications to or from the driver's mobile device. However, such devices require substantial power levels.

Many entities have developed and provided software solutions to prevent texting and driving. These solutions require the prior installation of the software on a user's phone and the cooperation of the user to allow the software to remain active while the user is driving. The problem with these solutions is that the user of the phone can defeat the software by disabling it. In addition, because the software only works on the phone upon which it is installed, it cannot prevent the use of other wireless devices within the automobile, e.g., the device of a friend or a second device owned by the user.

Therefore, a need exists to overcome the problems with the prior art as discussed above.

SUMMARY OF THE INVENTION

The present invention provides a system and method for preventing wireless communication while driving that overcomes the hereinafore-mentioned disadvantages of the heretofore-known devices and methods of this general type and that quickly and easily installs within a vehicle without the need for physical alteration of any portion of the vehicle or special wiring. Once installed, the device cannot be easily removed by the user, which forces him or her to refrain from engaging in dangerous mobile communication while the vehicle is in motion.

With the foregoing and other objects in view, there is provided, in accordance with the invention, a device that detects movement of the vehicle and requires coupling and cooperation between the device and a user's mobile computing device such that the user's mobile computing device is unable to receive and/or transmit data while the automobile is moving.

In accordance with embodiments of the present invention, a text prevention device can identify the number of persons within automobile and requires coupling and cooperation between the device and each user's mobile computing device such that each user's mobile computing device is unable to receive and/or transmit data while the automobile is moving.

In accordance with yet another embodiment of the present invention, a text prevention device can alert a third party that one or more passengers within the moving vehicle that have not coupled their mobile computing device to a text prevention device within the vehicle.

Although the invention is illustrated and described herein as embodied in a system and method for preventing wireless communication while driving, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the inventive jamming device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
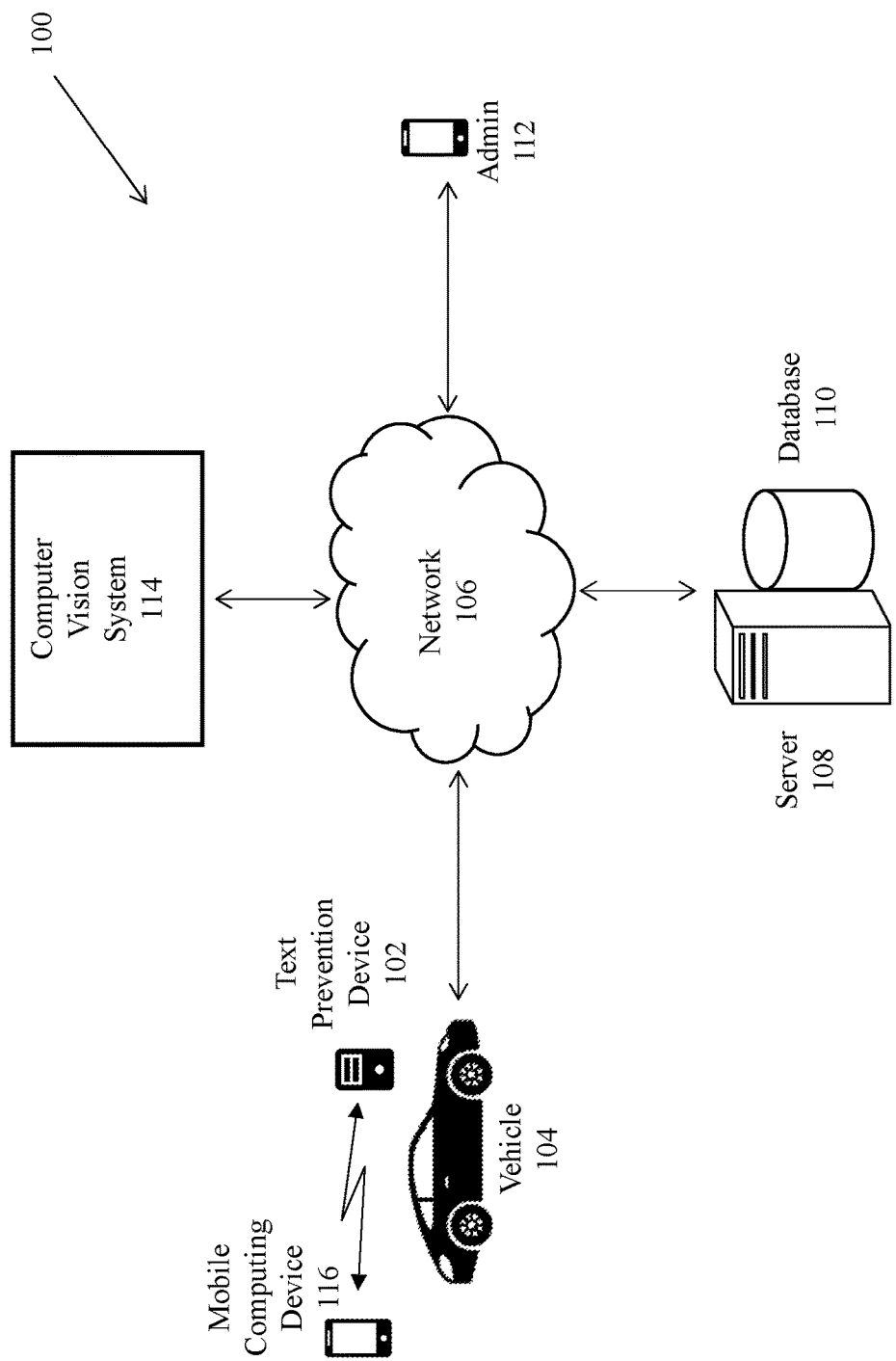
FIG. 1 is a block diagram depicting an exemplary system for preventing computing device use during operation of a moving vehicle, according to an example embodiment.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides novel systems and methods for preventing operation of a mobile computing device while operating a moving vehicle. Embodiments of the invention provide a text prevention device (TPD) designed to be installed in an automobile configured to detect if the automobile is in motion, detect if mobile computing devices are within the automobile, and prevent functionality of the mobile computing devices based on the attempted task being performed on the mobile computing devices. Embodiments of the invention provide an unconventional apparatus including at least one sensor wherein the apparatus may be communicative coupled to a plurality of sensors disposed within the automobile configured to perform phase detection via triangulation in order to detect mobile computing devices present within the automobile. Furthermore, in some embodiments, the systems and methods provided herein are configured to utilize computer vision based on real-time collected media acquired within the interior of the automobile in order to detect mobile computing devices within the automobile. In some embodiments, the TPD is designed to be communicatively coupled to a server configured to allow data received by the TPD to be reviewed and analyzed by a central authority in order to monitor activities of occupants on mobile computing devices within the automobile in real-time. The systems and methods described herein provide improvements to safety and security of motorists via application of the TPD to automobiles by preventing use of mobile computing devices within automobiles resulting in a significant reduction of distractions and impairments for motorists while operating a vehicle.

Referring now to FIG. 1, a system for preventing operation of a mobile computing device while operating a moving vehicle 100 is depicted, according to an exemplary embodiment. In one embodiment, system 100 includes a TPD 102, also know as the apparatus, configured to be installed in a vehicle 104. In one embodiment, TPD 102 is configured to be installed in the front panel of vehicle 104 in a manner in which TPD 102 is affixed to and/or integrated with a component of vehicle 104 without requiring any physical alteration of any portion of vehicle 104 or special wiring. For example, TPD 102 may include components configured to support one or more connections in which TPD may be inserted into one or more ports including but not limited to universal serial bus (USB) ports, lightning ports, AC/DC, onboard diagnostic (OBD) port, or any other applicable form of power enabling port known to one of ordinary skill in the art. In one embodiment, TPD 102 is attachable and/or affixable to a surface associated with vehicle 104, such as but not limited to the dashboard, windshield, rearview mirror, or any other applicable surface/component of a vehicle. TPD 102 may further include a rechargeable power source configured to power the components of TPD 102 referred to throughout the disclosure. In one embodiment, the power source may include an anti-tampering feature in which if the power level is below a predetermined power threshold in TPD 102 or if the at least a sensor detects signs of an occupant attempting to remove TPD 102 from the one or more ports of the vehicle 104, then an alerting mechanism is triggered via an audible alarm and/or admin mobile computing device 112/central authority of notified. In one embodiment, if TPD 102 is unplugged from the one or more ports for a designated period of time, forcing TPD 102 to rely on stored battery power within the rechargeable power source then, TPD 102 notifies the applicable party that an occupant has tampered with TPD 102. In other words, TPD 102 may include an adapter mechanism wherein the adapter is configured to sense an open circuit or a closed-circuit that indicates that TPD 102 is not plugged in the one or more ports. As described herein, the central authority may be a parent, guardian, employer, supervisor, principal, or any other applicable entity configured to track, monitor, and analyze conditions and components within vehicle 104.

In an embodiment, TPD 102 is equipped with a secure locking power connection, such as that described in U.S. Pat. No. 9,467,928, which shares inventorship with the instant application. Such a locking power connection ensures that only authorized individuals can disable and/or remove TPD 102 from the vehicle 104.

In one embodiment, TPD 102 includes a solar panel configured to receive photons in order to generate a flow of electricity to power TPD 102, wherein excess energy is stored in the rechargeable power source. In some embodiments, TPD 102 includes at least one sensor wherein a sensor may include but is not limited to a camera, microphone, biometrics sensor, infrared sensor, thermal sensor, heartbeat sensor, radio frequency sensor, magnetometer, optoelectronic sensor, motion detector, or any other applicable sensor known to those of ordinary skill in the art. Furthermore, TPD 102 may include a storage mechanism such as but not limited to a memory card or any other applicable storage mechanism configured to retain data acquired by TPD 102.

In one embodiment, TPD 102 further includes a solo transponder designed to allow TPD 102 to function as a mobile computing device configured to support an embedded cellular radio resulting in the mobile computing device in connection with TPD 102 operating in airplane mode while the TPD 102 functions in the capacity of a mobile computing device. TPD 102 can have its transmissions disabled while vehicle 104 is in motion. In one embodiment, TPD 102 includes an integrated speaker and/or microphone in order to support notification of authorized activities being ported to TPD 102 from the connected mobile computing device 116. For example, an authorized contact may text the mobile computing device 116 connected to TPD 102, but TPD 102 is serving as a proxy for the mobile computing device. As used herein, the term "proxy" describes a device that serves one or more functions of another device. For example, the "proxy" device, TPD 102, can make and receive calls on behalf and instead of the mobile computing device 116. TPD 102 may read aloud from the speaker the received text message from an authorized contact that sent a message to the mobile device 116. In one embodiment, TPD 102 is configured to detect the signal strength associated with a mobile computing device within vehicle 104 along with the status of an application running on the mobile computing device in order to ensure that unauthorized activities attempted on the mobile computing device may be flagged and prevented by TPD 102. For example, if a mobile application is running in the background of the mobile computing device 116, then TPD 102 may detect the mobile application and prevent transmission of signals associated with the mobile application from being emitted altogether while vehicle 104 is in motion. To do this, TPD 102 can include with it a software application that runs on mobile computing device 116. The software monitors the mobile computing device 116 in conjunction with the hardware device, TPD 102.

It is to be understood that TPD 102 is configured to function locally in some embodiments wherein TPD 102 establishes connections with mobile computing devices within vehicle 104 and data is acquired by components of TPD 102, such as the at least one sensor, configured to be stored locally on the storage mechanism and subsequently accessed by a central authority associated with TPD 102. For example, the motorist of vehicle 104 may be an employee of a package delivery company in which the package delivery company provides TPD 102 in vehicle 104 in order to monitor the mobile computing device use of the employee within vehicle 104 by accessing the data stored on the storage mechanism, originally collected by TPD 102, and analyzing said data. Although TPD 102 is configured to function in a local configuration requiring no active network connection to function (establish connections between TPD 102 and mobile computing devices), the aforementioned pertains to a configuration that supports interactions between TPD 102 and a server 108 over a communication network 106, in which network 106 may be implemented as a Local Area Network (LAN), Wide Area Network (WAN), Public Switched Telephone Network (PSTN), Virtual Private Network (VPN), mobile communication network (GSM, GPRS, CDMA, MOBITEX, EDGE), Ethernet or the Internet, one or more terrestrial, satellite or wireless links, or any medium or mechanism that provides for the exchange of data between the aforementioned components of system 100. It is to be understood that TPD 102 being communicatively coupled to server 108 in some embodiments does not restrict the functionality of TPD 102 to perform thwarting of attempts to enable text/calling features by an operator, storing locally, and subsequently having data manually retrieved from the storage mechanism. As described herein, vehicle 104 may be an automobile, ATV, trike, motorcycle, truck, bus, train, boat, ship, aircraft, spacecraft, or any other applicable means of transportation requiring an operator.

In one embodiment, system 100 further includes a database 110 communicatively coupled to server 108, an admin computing device 112 associated with the aforementioned central authority configured to communicate with TPD 102 and server 108 over communication network 106, and a computer vision system 114 configured to analyze images and videos captured by at least the sensor of TPD 102 and perform detection and monitoring functions based on the analyses. In some embodiments, computer vision system 114 or a portion thereof, resides inside TPD 102 and is capable of analyzing images and video, as will be described below. Database 110 is configured to maintain profiles specific to TPD 102 pertaining to mobile computing devices that interact with TPD 102 allowing server 108, alone or in combination with computer vision system 114, to retrieve data from database 110 and analyze data associated with a mobile computing device present within vehicle 104 in addition to whether the mobile computing device has an established connection with TPD 102. In one embodiment, server 108 is configured to deploy applicable software configured to TPD 102 to function based on one or more software applications receiving interactions from the driver.

It is to be understood that the purpose of TPD 102 is to ensure that there is no mobile computing device within vehicle 104 that is operating without being in linked communication with TPD 102, and if the mobile computing device is detected by TPD 102 but is not in linked communication with TPD 102 (or cannot establish a connection with TPD 102) then TPD 102 is configured to emit a continuous alert via an audible alarming sound, an emitting of light, or any other applicable alerting mechanism configured to be heard by each occupant in vehicle 104 and further configured to cease once a communicative link is established between TPD 102 and the detected but unconnected mobile computing device 116. In one embodiment, the alerting mechanism triggers TPD 102 to report the incident of a detected and unconnected device to admin mobile computing device 112, the central authority, or any other applicable entity associated with the operations of TPD 102. It is to be understood that examples of computing devices include a laptop computer, a tablet computer, a smartphone, a media player, a Personal Digital Assistant (PDA), and any other mechanism including a processor and functionality capable of distracting a motorist while vehicle 104 is in motion. System 100 illustrates only one of many possible arrangements of components configured to perform the functionality described herein. Other arrangements may include fewer or different components, and the division of work between the components may vary depending on the arrangement.

Server 108 may be implemented in hardware, software, or a combination of hardware and software; however, the primary purpose of server 108 is to ensure that information collected by TPD 102 is formatted and received in a manner which is analyzable by the central authority, via a downloadable report, in order to verify mobile computing device activities occurring within vehicle 104. In one embodiment, TPD 102 further includes an accelerator, gyroscope, inertial measurement unit, or any other applicable mechanism configured to calculate motion and/or speed of motion of vehicle 104. It is to be understood that the aforementioned features may also be used by TPD 102 to gather driving parameters associated with operations of vehicle 104, such as, but not limited to, driving time, driving patterns, unnecessary braking, speed, erratic driving, and any other applicable ascertainable information associated with the operation of vehicle 104. In one embodiment, TPD 102 is configured to detect the speed of vehicle 104 and, if vehicle 104 exceeds a predetermined speed threshold, TPD 102 prevents applicable mobile computing devices in linked communication with TPD 102 from transmitting and/or receiving particular signal transmissions due to TPD 102 serving as a proxy and/or intermediary device configured to intercept communications on behalf of the mobile computing devices. In one embodiment, the predetermined speed threshold is 5 mph; however, in some embodiments the predetermined speed threshold is established by a user associated with admin computing device 112. In one embodiment, TPD 102 is configured to function until the engine and/or applicable power source associated with vehicle 104 is powered off. In one embodiment, TPD 102 is configured to notify the central authority, via admin computing device 112, of the status of the linked connection between the mobile computing device and TPD 102 upon vehicle 104 exceeding the predetermined speed threshold. For example, server 108 may receive and relay to admin computing device 112 a notification that the link connection between TPD 120 and the mobile computing device is "successfully established," "unsuccessful," or "not established," wherein TPD 120 continuously emits the alarm sound if the link connection between TPD 120 and the mobile computing device is anything except successful. It is to be understood that TPD 120 will continue to emit the alarm sound when there is a successful connection between TPD 120 and the mobile computing device 116 only if there is one or more additional mobile computing devices (secondary computing devices) within vehicle 104 that have been detected by TPD 102, via at least the sensor, thus prompting occupants within vehicle 104 who do not have their mobile computing devices connected to TPD 102 to establish a linked connection to TPD 102. It is to be understood that TPD 102 serves as the middle party between the client devices (the mobile computing devices 116) and the applications (texting, calling, browsing, etc.) that performs a service on requests and/or responses. The proxy configuration for TPD 102 may be a half proxy, full proxy, forward proxy, reverse proxy, or any other applicable proxy configuration designed to accomplish the goals of this disclosure. In a preferred embodiment, TPD 102 simultaneously prevents all signals received and transmitted to the mobile computing device that have not been explicitly included in a "whitelist." The whitelist represents types of functions the mobile computing device 116 can perform, either by itself or through TPD 102, serving as a proxy device. TPD 102 and/or server 108 can be configured to manage the whitelist, including a plurality of authorized contacts and a plurality of authorized activities to be performed on mobile computing devices 116 while vehicle 104 is in motion. It is to be understood that the whitelist may be designed and configured based upon the preferences of the user of admin computing device 112 and/or a central authority; however, TPD 102 may have a default setting in which only emergency calls to emergency communication services are not intercepted/prevented by TPD 102, allowing the mobile computing device to transmit and/or receive communications to/from the applicable emergency communication service. For example, the central authority may specify that the mobile computing device associated with the motorist may only receive and transmit incoming/outgoing calls and/or texts from a specific telephone number associated with admin computing device 112 in addition to the applicable emergency communication service, such as a 911 dispatcher. Activities not included on the whitelist are considered unauthorized activities, wherein performance of the unauthorized activities on mobile computing devices within vehicle 104 are prevented while vehicle 104 is exceeding the predetermined speed threshold if the applicable mobile computing device is in connection with TPD 102. Thus, all calls, texts, or other applicable mobile computing device transmissions transmitted and/or received to/from the mobile computing device that are not associated with the specific telephone number associated with admin computing device 112 and/or the applicable emergency communication service are received directly by TPD 102 while vehicle 104 is in motion. These transmissions are transmitted to the applicable party, such as admin mobile computing device 112 and/or central authority, by TPD 102 once vehicle 104 has come to a stop. In addition, TPD 102 is configured to interact with the onboard diagnostics (OBD) port of vehicle 104 in order to pull vehicle information, e.g., determine speed of the vehicle.

Although the term "text prevention device" is used herein, TPD 102 is also capable of disabling/preventing many other forms of communications, such as but not limited to phonecalls, text messages, video telephony, browsing, or any other applicable action on a mobile computing device that is capable of distracting a motorist. Therefore, the term "text prevention device" and "TPD" should not be interpreted as only preventing texting.

Figure 2:
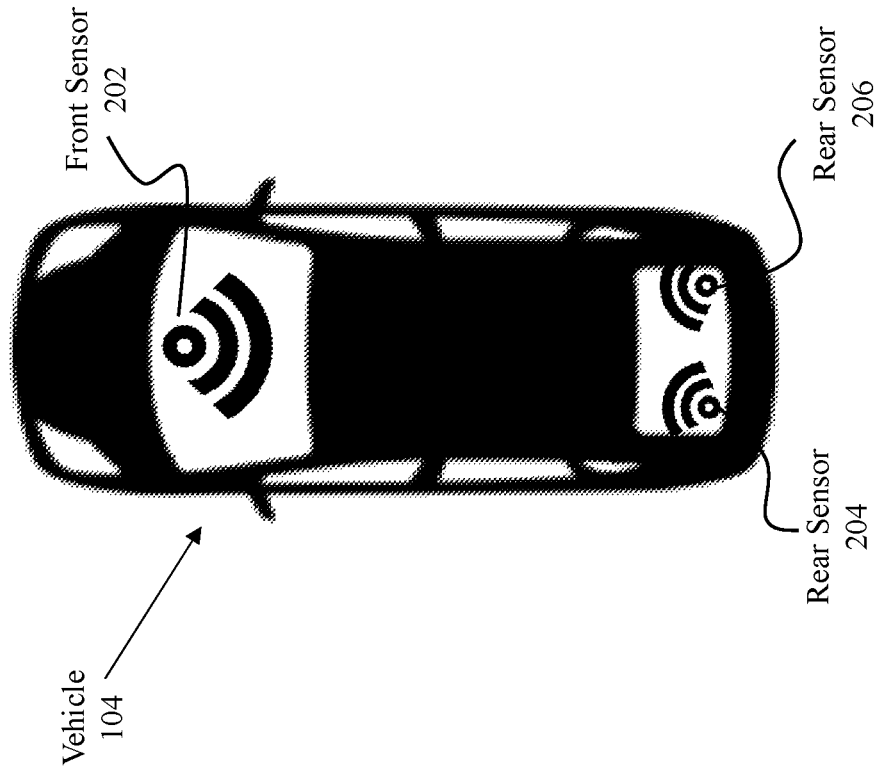
FIG. 2 is an exemplary vehicle utilizing the system for preventing computing device use during operation of the vehicle, according to an example embodiment.

Referring now to FIG. 2, a top-view diagram of vehicle 104 including the system 100 for preventing operation of a mobile computing device 116 is depicted, according to one embodiment. In this embodiment, vehicle 104 includes a front sensor 202, a first rear sensor 204, and a second rear sensor 206 wherein sensors 202-206 are communicatively coupled to TPD 102 (not shown) and configured to be shaped, sized, and disposed to support wireless signal triangulation in order to ensure that mobile computing devices 116 detected by TPD 102 are limited to mobile computing devices within the interior of vehicle 104. It is to be understood that sensors 202-206 may be antennas allocated at ample distances from each other within vehicle 104 configured to discover signals from mobile computing devices within an area defined by sensors 202-206. In particular, the detection of phase difference between at least two of sensors 202-206 may be used to determine which direction a cellular signal is being transmitted from. The purpose of sensors 202-206 is to avoid detection by TPD 102 of mobile computing devices outside of vehicle 104. Sensors 202-206 support phase detection or directional detection allowing TPD 102 to filter and detect only mobile computing devices included within the interior of vehicle (the area) 104. In one embodiment, sensors 202-206 may be utilized by TPD 102 to perform the aforementioned features of the at least one sensor associated with TPD 102. Thus, sensors 202-206 may be communicatively coupled to at least one of TPD 102, vehicle 104, and/or computer vision system 114 wherein data collected by sensors 202-206 is transmitted over network 106. There can be also be more than three sensors 202-206 and they can be located at any location within or on vehicle 104. In one embodiment, front sensor 202 may also be a forward sensing camera configured to acquire media, along with monitor and detect objects and interactions occurring within the front of vehicle 104 in real-time wherein acquired media may be collected and stored on the storage mechanism and/or database 110 at various intervals. In one embodiment, TPD 102 includes one or more cameras disposed and/or integrated into TPD 102 wherein one camera acquires media occurring within the front of vehicle 104 and the other cameras acquire media occurring within vehicle 104 and transmits said media to server 108. In one embodiment, TPD 102 may include an emergency button wherein pressing of the emergency button activates an emergency operation mode in which TPD 102 functionality is disabled allowing the driver to make a call to an emergency contact; however, upon emergency operation mode being activated TPD 102 transmits a notification along with media acquired from the aforementioned sensors to server 108 allowing admin computing device 112 the opportunity to review the conditions associated with activation of emergency operation mode.

Figure 3:
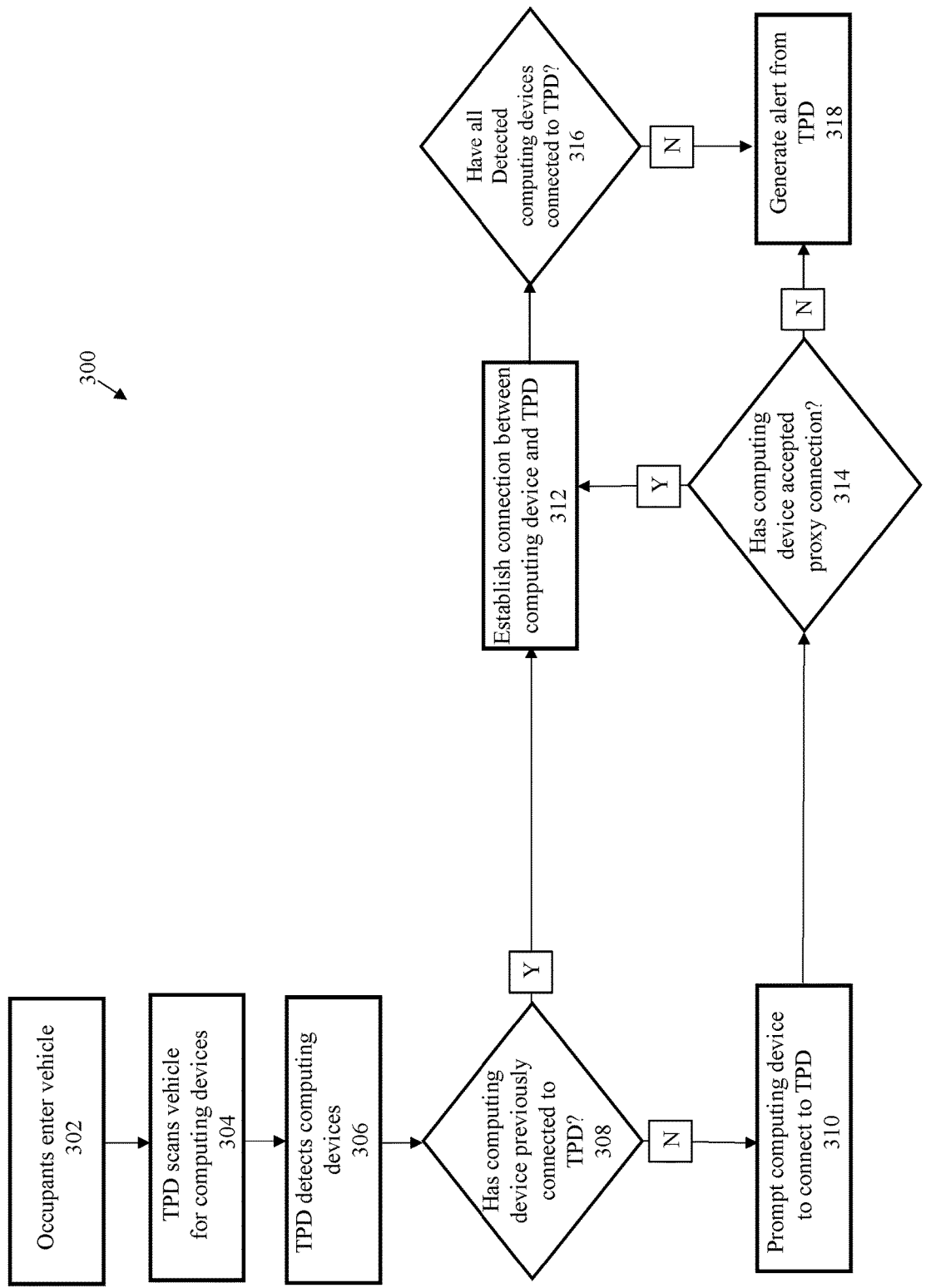
FIG. 3 is a block diagram illustrating an exemplary method for connecting a computing device to a text prevention device, according to an example embodiment.

Referring now to FIG. 3, a block diagram depicting an exemplary method 300 for connecting a mobile computing device to TPD 102, according to one embodiment. At step 302, occupants enter vehicle 104 each of which is presumed to have a mobile computing device. It is to be understood that TPD 102 is configured to detect if a particular occupant has more than one mobile computing device based on signals being transmitted to/from said devices. However, it is to be understood that TPD 102 may detect computing devices and any other applicable electronics via utilizing a radio frequency detector, field strength meter, or any other applicable device configured to detect the presence or lack thereof of electronics. At step 304, TPD 102 utilizes the at least one sensor and/or sensors 202-206 to detect mobile computing devices associated with the occupants within the interior of vehicle 104. It is to be understood that TPD 102 is configured to be actively searching for computing devices while TPD 102 is powered within vehicle 104. At step 306, TPD 102 detects the mobile computing devices within the interior of vehicle 104 via radio frequency or other applicable signals being emitted from the mobile computing devices. At step 308, TPD 102 and/or server 108 determines whether mobile computing device 116 (in addition to the other detected mobile computing devices) have previously connected with TPD 102 allowing TPD 102 to serve as a proxy device. If not, step 310 occurs in which TPD 102 prompts mobile computing device 116 to connect to TPD 102 and subsequently step 314 occurs in which TPD 102 double-checks that mobile computing device 116 has accepted the proxy connection with TPD 102. If so, step 312 occurs in which a connection is established between mobile computing device 116 and TPD 102. Referring back to step 314, if mobile computing device 116 accepts the proxy connection then step 312 occurs and the connection is established between TPD 102 and the new device. If mobile computing device 116 does not accept the proxy connection then step 318 occurs in which TPD 102 emits the alert for all occupants to be notified that a mobile computing device exists within vehicle 104 and that TPD 102 is not connected to it. At step 316, TPD 102 verifies if all detected devices within vehicle 104 have been connected to TPD 102 and if not, step 118 occurs and the notification of present but unconnected mobile devices within vehicle 104 is emitted.

Figure 4:
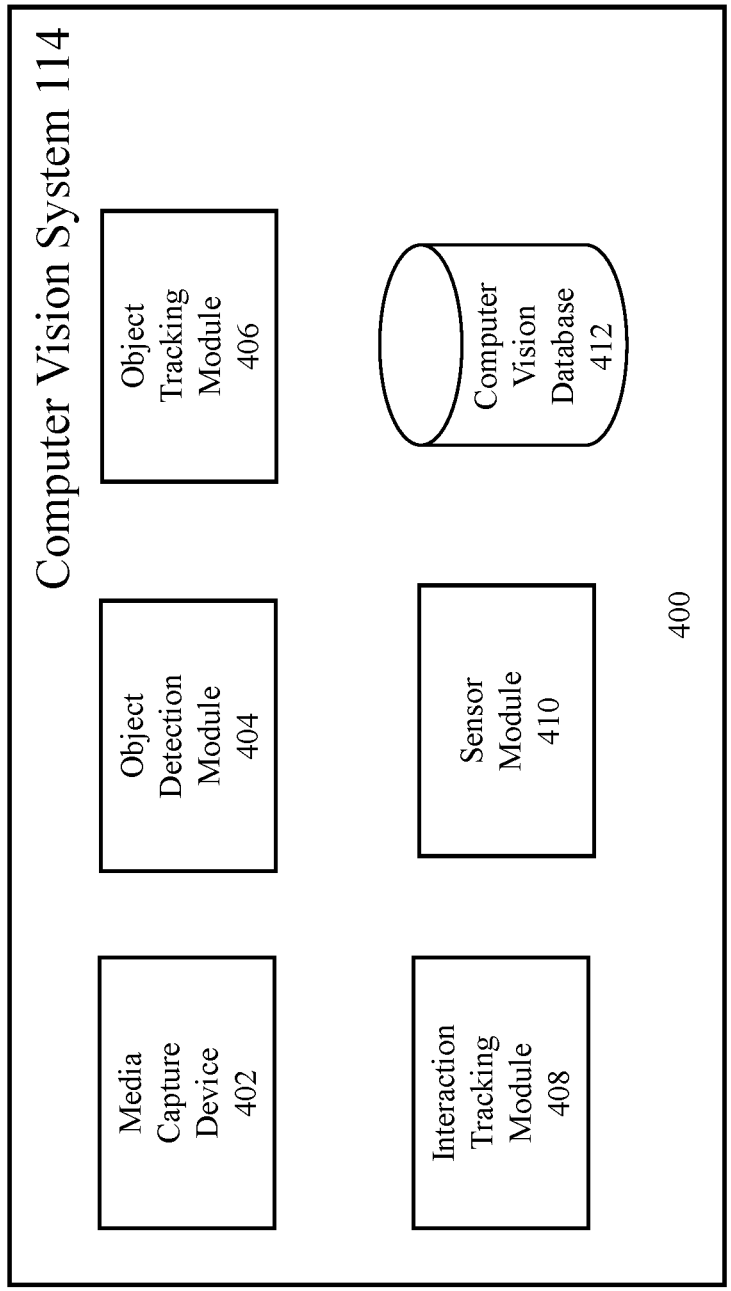
FIG. 4 illustrates a block diagram depicting an exemplary computer vision system utilized by the system for preventing computing device use during operation of a moving vehicle, according to an example embodiment.

Referring now to FIG. 4, a block diagram 400 illustrating an exemplary computer vision system 114 is depicted, according to an embodiment of the present invention. It is to be understood that computer vision system 114 may be utilized in real time and is configured to utilize images and videos acquired from an applicable sensor in addition to deep learning models in order to accurately identify and classify objects with the captured images and videos. In one embodiment, computer vision system 114 may include a media capture device 402, an object detection module 404, an object tracking module 406, an interaction tracking module 408, a sensor module 410, and a computer vision database 412. In one embodiment, sensor module 410, alone or in combination with the at least one sensor and/or media capture device 402, may be utilized to capture images and/or videos of the interior of vehicle 104 allowing object detection module 404 and object tracking module 406 to detect the presence and location of mobile computing devices within vehicle 104. One or more sensors of system 100 may be configured to perform biometric detection such as face recognition, retinal scanning, fingerprinting, or any other applicable mechanism for biological sample-based identification. Collection of a plurality of media by the applicable sensor of system 100 (at least one sensor, media capture device 402, and/or sensor module 410) may be performed in real time in specified increments of time wherein the frames and/or records associated with the increments of time are configured to be stored on the storage mechanism in order to support subsequent review by the central authority. In one embodiment, interaction tracking module 408 may be utilized, alone or in combination with object detection module 404, to not only detect and monitor the eye gaze or focal point of the motorist within vehicle 104, but also analyze interactions between the motorist and the one or more detected mobile computing devices in order to provide analytics and micro-analytics associated with distractions and impairments relating to the motorist. For example, if a mobile computing device is detected within the interior of vehicle 104, whether the mobile computing device is or is not communicatively linked with TPD 102, interaction tracking module 408 is configured to track the amount of instances and the amount of time associated with said instances in which the eye gaze of the motorist is directed towards the mobile computing device. This function allows admin mobile computing device 112 to monitor and analyze the source and frequency of distractions and impairments associated with the motorist while operating vehicle 104. The aforementioned collected data in addition to the analyses performed on the collected data is designed to be stored and maintained on computer vision database 412 configured to be communicatively coupled to server 108 or may simply be stored locally on the storage mechanism. In one embodiment, sensors 202-206 are components of sensor module 410 allowing the detection of mobile computing devices within the interior of vehicle 104 to be tracked via sessions (periods of time in which the object detection module 404 is actively detecting mobile computing devices within vehicle 104) wherein the sessions and session data may be housed in computer vision database 412.

In one embodiment, TPD 102 is configured to verify the identity of an occupant within vehicle 104 in real time based on biometric data acquired by at least one of the sensors of system 100 wherein the at least one sensor, media capture device 402, and/or sensor module 410 acquires the plurality of media and identifies the occupant based on facial features such as contours and profile of the occupant's face. The occupant is verified via server 108 matching the facial features of the occupant to facial features included in photos or videos of the occupant associated with a social media account of the occupant. For example, TPD 102 may acquire an image of an occupant within vehicle 104 and verify the identity of the occupant by comparing the acquired image to a social media image of the occupant provided on the social media account associated with the occupant. It is to be understood that social media account may include but is not limited to Facebook, Instagram, Twitter, Pinterest, or any other platform including images and videos that depict identifiable features of an individual within applicable media. In one embodiment, data associated with the identification of the occupant may be transmitted over network 106 to admin mobile computing device 112 allowing the central authority to view and/or analyze the occupant within vehicle 104.

Figure 5:
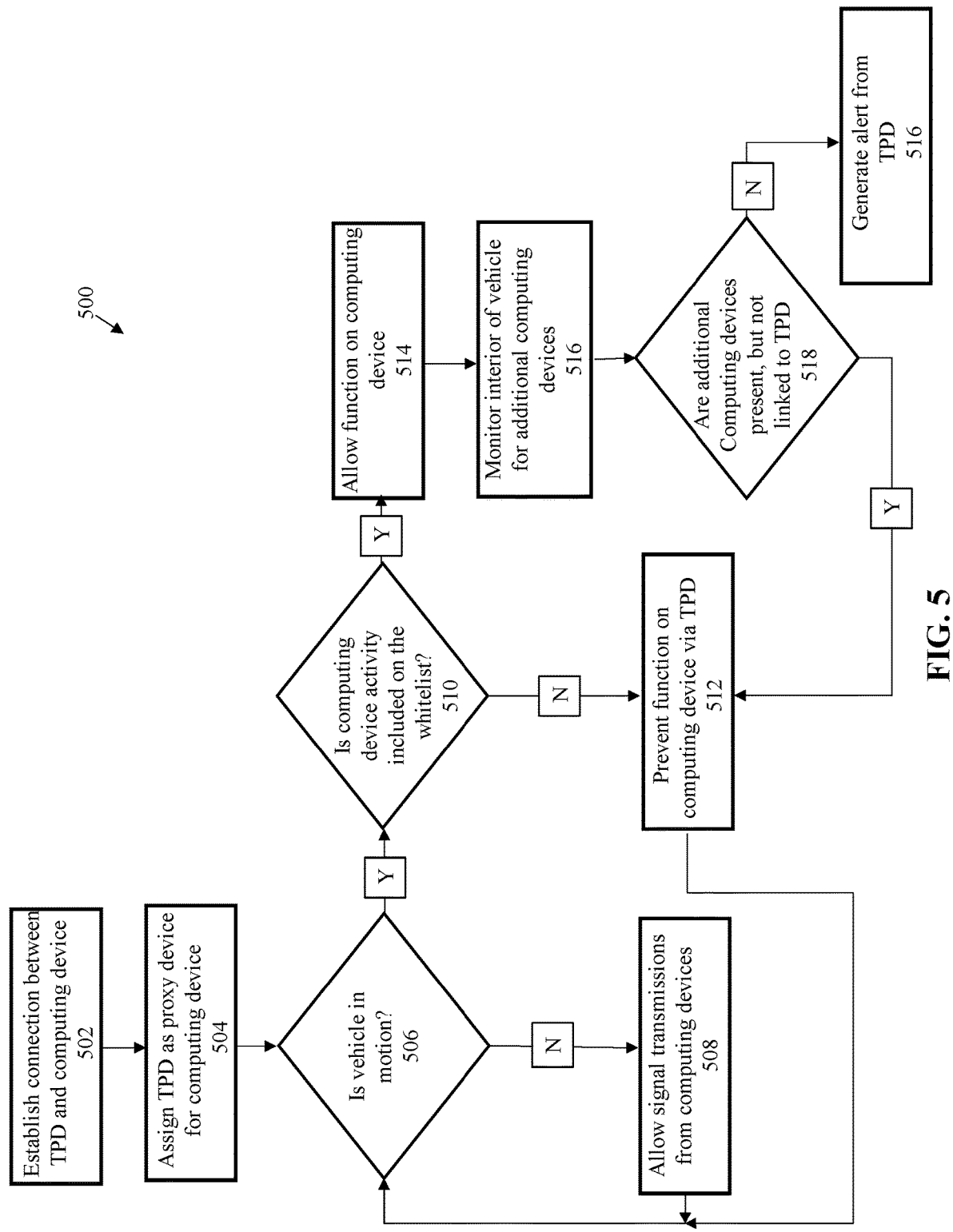
FIG. 5 is a block diagram illustrating an exemplary method for preventing computing device use during operation of a moving vehicle, according to an example embodiment.

Referring now to FIG. 5, a block diagram depicting an exemplary method for preventing operation of a mobile computing device while operating a moving vehicle 500, according to one embodiment. At step 502, the automobile is turned on and TPD 102 begins to actively search for mobile computing devices operating within the interior of vehicle 104 by sending one or more inquiry signals to detect the presence of both mobile computing devices that have previously connected with TPD 102 and new mobile computing devices. If the automobile starts to move and TPD 102 was not able to establish a connection with a detected mobile computing device, then TPD 102 alerts occupants, server 108, and/or admin computing device 112 of the lack of connection. In one embodiment, if TPD 102 is installed in vehicle 104 and is not linked to a mobile computing device then TPD 102 triggers media capture device 402 and captures a plurality of images and videos of the interior of vehicle 104 in real-time. It is to be understood that the purpose of TPD 102 in utilizing devices to scan the interior of vehicle 104 is to acquire occupancy/vacancy information and mobile computing device presence within the interior of vehicle 104; however, in some embodiments, TPD 102 may utilize the at least one sensor to detect occupants and mobile computing devices associated with the occupants. For example, the at least one sensor may utilize a first component to detect an occupant (via detected heartbeat associated with vibrometry, detected temperature associated with calorimetry, and/or via detected presence associated with photoelectricity), and a second component to detect the presence of mobile computing devices RF waves or any other applicable signals being emitted from mobile computing devices within vehicle 104. Upon detection of one or more occupants (via face detection, sound detection, etc.) along with one or more mobile computing devices within vehicle 104, TPD 102 establishes a connection with the one or more mobile computing devices. In one embodiment, pairing of TPD 102 and the mobile computing devices is accomplished by an encrypted handshake such as but not limited to Bluetooth pairing, magnetic induction, infrared, ultra wideband, ZigBee, or any other applicable secure pairing known to those of ordinary skill in the art. TPD 102 may further function as a Man in the Middle (MITIM) between the mobile computing device and applicable cellular network/tower in which TPD 102 eavesdrops or modifies the traffic traveling between the two entities once the mobile computing device is connected to TPD 102. In one embodiment, TPD 102 and/or server 108 may prompt the driver for a vehicle trip summary prior to the driver beginning operation of vehicle 104 in which server 108 transmits the vehicle trip summary in addition to the captured media to admin computing device 112 allowing the admin the opportunity to verify the vehicle trip summary based on the captured media. In one embodiment, TPD 102 and/or server 108 may be configured to generate a vehicle trip diagnostic report based on the collected media (via the aforementioned sensors) in order to present collected data and perform analytics relating to activities performed within vehicle 104 while in motion.

In TPD 102 establishing the connection with the mobile computing device 116, TPD 102 has acknowledged that vehicle 104 has exceeded the predetermined speed threshold and seeks to establish the connection with the detected mobile computing devices within the interior of vehicle 104 detected by TPD 102; otherwise, if mobile computing devices are detected but not engaged in a connection with TPD 102 then TPD 102 emits the alarm. In one embodiment, TPD 102 may initiate the connection process with mobile computing device by sending a prompt to an applicable mobile computing device 116 requesting to serve as a proxy for signal transmissions. At step 504, once a connection is established between TPD 102 and the applicable mobile computing device then TPD 102 is assigned as the proxy device for the applicable mobile computing device by receiving from the applicable mobile computing device a primary proxy communication authority. It is to be understood that a primary proxy communication authority is an affirmation extended via the occupant associated with the applicable mobile computing device to authorize TPD 102 to serve as the controller of incoming and outgoing signal transmissions associated with the applicable mobile computing device. At step 506, TPD 102 determines whether vehicle 104 is exceeding the predetermine speed threshold; however, it is to be understood that TPD 102 may perform this step prior to assigning itself as the proxy device to the applicable mobile computing device. The purpose of step 506 is to ensure that occupants are not actively using mobile computing devices while vehicle 104 is in motion; thus, eliminating any potential distractions to the driver of vehicle 104. In one embodiment, TPD 102 serving as a proxy for the applicable mobile computing device 116 generates a reduced functionality of the applicable mobile computing device wherein access to particular functions of the applicable mobile computing device 116 are deactivated by TPD 102. For example, when assigned as a proxy to the applicable mobile computing device 116, TPD 102 may prevent data from being applied to certain applications running on the applicable mobile computing devices such as but not limited to messaging and voice over IP platforms, web browsing platforms, content streaming platforms, and any other applicable application or functionality associated with a computing device while functionality of other applications may be untampered with by TPD 102, such as GPS applications. This way the applicable mobile computing device can still send and/or receive signal transmissions associated with applications and authorized contacts included on the whitelist. In addition, TPD 102 may further be designed and configured to prevent an occupant from disabling the proxying feature of TPD 102 while vehicle 104 is in motion or actively log that an occupant is attempting to circumvent the text prevention features of TPD 102 and report the logging to the central authority.

If TPD 102 detects that vehicle 104 is not in motion and is not exceeding the predetermined speed threshold, then step 508 occurs in which TPD 102 allows the sent or received signal transmission to be sent from or received by the applicable mobile computing device. Otherwise, if the TPD 102 detects vehicle 104 exceeding the predetermined speed threshold then step 510 occurs in which TPD 102, alone or in combination with server 108, determines whether the applicable mobile computing device is attempting to perform an action and/or functionality that is included on the whitelist. If the attempted action/functionality is not included on the whitelist, then step 512 occurs in which TPD 102 prevents the function from occurring on the applicable mobile computing device. In one embodiment, TPD 102 preserves the one or more signal transmissions intended to be sent or received by the applicable mobile computing device not included on the whitelist, wherein TPD 102 preserves or temporarily inhibits transmission of the one or more signal transmissions until vehicle 104 does not exceed the predetermined speed threshold resulting in the one or more signal transmissions being sent or received to/from the applicable mobile computing device. For example, if the applicable mobile computing device receives a text message associated with an unauthorized contact that is not included on the whitelist then TPD 102 receives the text message and does not transmit the text message to the applicable computing device until TPD 102 detects that the predetermined speed threshold is not being exceeded. If the one or more signal transmissions are included on the whitelist then step 514 occurs in which TPD 102 allows the function to occur on the applicable mobile computing device. For example, if the applicable mobile computing device receives a phone call from an authorized contact included on the whitelist then TPD 102 will not proceed with interfering with the transmission and allow the applicable mobile computing device to receive it directly. At step 516, TPD 102 actively monitors and tracks the interior of vehicle 104 in search of occupants and mobile computing devices not communicatively linked to TPD 102. In one embodiment, TPD 102 may utilize the at least one sensor to detect the amount of occupants within vehicle 104 and require that the number of mobile computing devices in vehicle 104 must be equal to at least the detected amount of occupants, wherein if less mobile computing devices than detected occupants in vehicle 104 are connected to TPD 102 then TPD 102 alerts admin mobile computing device 112 and/or the central authority. The underlying approach of this feature is due to the likelihood of an occupant of vehicle 104 having a mobile computing device and having the ability to attempt to distract the operator of vehicle 104 by impairing the vision and attention of the operator via said mobile computing device. In one working example, TPD 102 utilizes the at least one sensor to detect the total amount of occupants in vehicle 104 via utilization of the at least one sensor to capture a plurality of media and/or media capture device 402 allowing object detection module 404 to detect the mobile computing devices, and TPD 102 and/or server 108 to determine if the number of detected mobile computing devices is equal or greater than the number of occupants in which a request to connect is extended to each applicable mobile computing device via TPD 102, and the alarming mechanism emits until each of the detected mobile computing devices are connected to TPD 102. It is to be understood that TPD 102 may perform the aforementioned step at any point during method 500 and TPD 102 may utilized the at least one sensor disposed on TPD 102 and/or components of computer vision system 100 in order to actively detect and monitor occupants of vehicle 104, mobile computing devices present within vehicle 104, and mobile computing device usage of occupants, via objecting tracking module 406 and/or interaction tracking module 408, while vehicle 104 is in motion. In the configuration of system 100 where TPD 102 functions strictly at a local level, the data acquired by TPD 102 and/or components of computer vision 102 are stored in the storage mechanism for analysis by admin computing device 112 and/or the central authority. At step 518, TPD 102 determines whether additional mobile computing devices are present within the interior of vehicle 104 based on the aforementioned monitoring and detecting step. If the one or more mobile computing devices are detected but are not connected to TPD 102 and/or not attempting to respond to the one or more inquiry signals transmitted by TPD 102 then step 516 occurs in which TPD emits the alert mechanism. Otherwise, TPD allows the one or more signal transmissions from the mobile computing device if the transmission is included on the whitelist. Once vehicle 104 has come to a stop, TPD 102 is configured to release the proxy connection with the mobile computing devices allowing the mobile computing devices to maintain normal functionality. In one embodiment, TPD 102 will emit a notification that the session is done via an audio message from the speaker, a text notification, or any other applicable form of notification.

Figure 6:
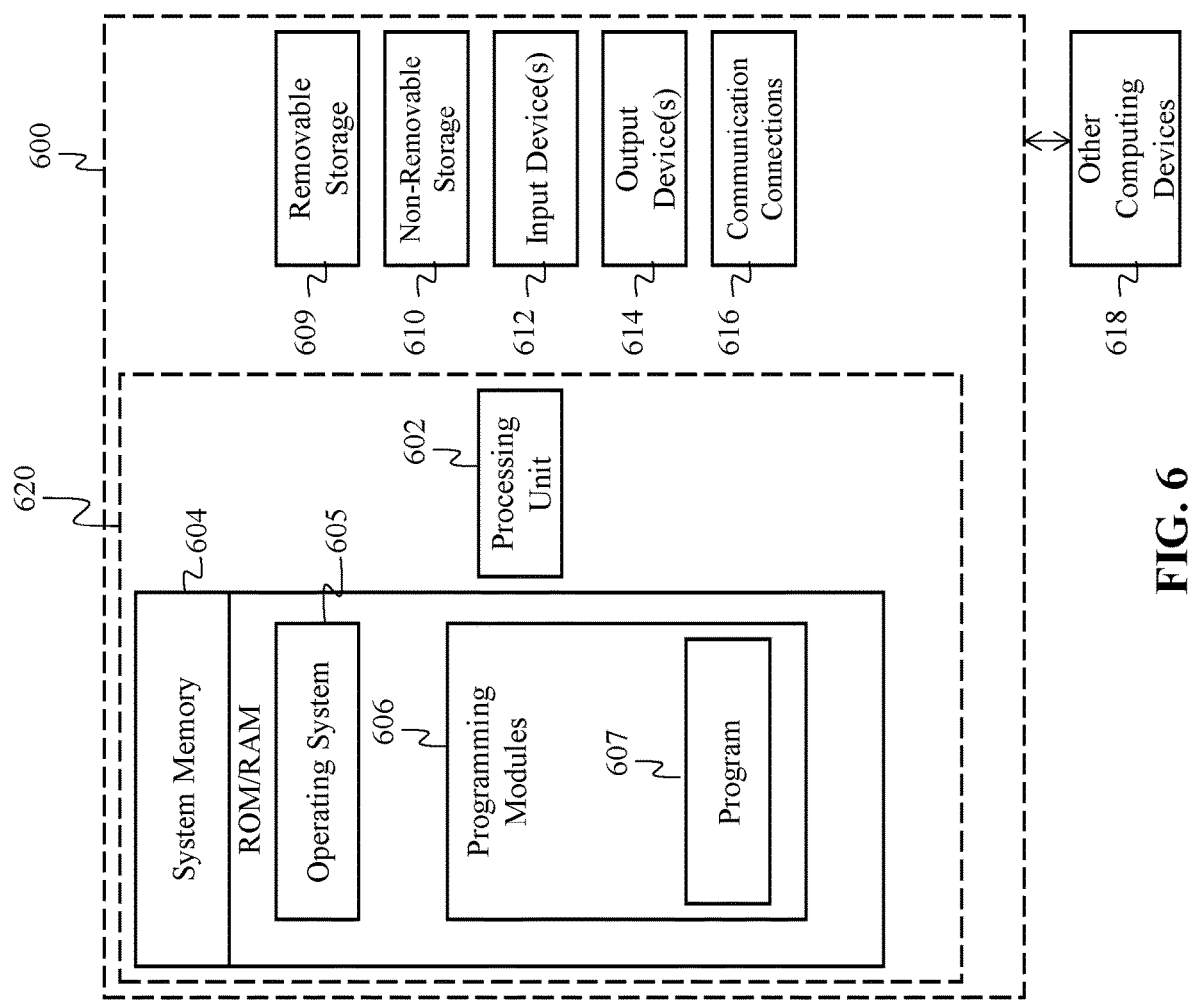
FIG. 6 illustrates a computer system according to exemplary embodiments of the present technology.

FIG. 6 is a block diagram of a system including an example computing device 600 and other computing devices. Consistent with the embodiments described herein, the aforementioned actions performed by devices 102, server 108, and 112 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and method 500. Method 5, and data related to said method may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 102, server 108, and 112, for example. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 66 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes 600 and 700 as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

What is claimed is:

1. A method for preventing computing device use during operation of a moving vehicle, the method comprising: receiving, at a text prevention device (TPD) located within a vehicle, an identification a first computing device present within the vehicle; establishing a communication link between the TPD and the first computing device; receiving, at the TPD, a primary proxy communication authority from the first computing device; preventing at least one function of the first computing device when the TPD detects movement of the vehicle; monitoring, with a camera, an interior of the vehicle when the TPD detects movement of the vehicle; identifying, with the camera, the number of people within the vehicle; comparing the number of people within the vehicle to the number of computing devices with established communication links with the TPD; and activating an alerting mechanism in response to determining the number of people within the vehicle exceeds the number of computer devices with established communication links with the TPD, reporting, via the TPD, the number of people within the vehicle exceeds the number of computer devices with established communication links with the TPD to a central authority.

2. The method of claim 1, further comprising:
detecting the vehicle exceeding a predetermined speed threshold before activating the alerting mechanism.

3. The method of claim 1, further comprising:
maintaining, via the TPD, a whitelist comprising at least one of a plurality of activity entries and a plurality of contact entries; and
deactivating functionality of the first computing device based on contents of the whitelist.

4. The method of claim 3, wherein the plurality of activity entries comprises at least one of an unauthorized call, an unauthorized text, or a browsing activity.

5. The method of claim 1, wherein the step of activating an alerting mechanism includes at least one of:
saving an image of the interior of the vehicle to a memory; and
transmitting an image of the interior of the vehicle to a central authority.

6. The method of claim 1, wherein the step of activating an alerting mechanism includes transmitting a video stream containing images of the interior of the vehicle to a central authority.

7. The method of claim 1, wherein the step of activating an alerting mechanism includes sounding an audible alarm within the vehicle.

* * * * *